US011592995B2

(12) United States Patent
Srimal et al.

(10) Patent No.: US 11,592,995 B2
(45) Date of Patent: Feb. 28, 2023

(54) DATA STORAGE DEVICE AND METHOD FOR PREVENTING ACCIDENTAL UPDATES AND DELETIONS USING DATA VERSIONING

(71) Applicant: Western Digital Technologies, Inc., San Jose, CA (US)

(72) Inventors: Niraj Srimal, Marathalli (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 22 days.

(21) Appl. No.: 17/234,387

(22) Filed: Apr. 19, 2021

(65) Prior Publication Data

US 2022/0334730 A1    Oct. 20, 2022

(51) Int. Cl.
*G06F 3/06* (2006.01)
*G06F 12/10* (2016.01)

(52) U.S. Cl.
CPC .......... *G06F 3/0619* (2013.01); *G06F 3/0659* (2013.01); *G06F 3/0679* (2013.01); *G06F 12/10* (2013.01); *G06F 2212/1032* (2013.01)

(58) Field of Classification Search
CPC .... G06F 3/0619; G06F 3/0659; G06F 3/0679; G06F 12/10; G06F 2212/1032
See application file for complete search history.

(56) References Cited

U.S. PATENT DOCUMENTS

| 7,587,564 | B2 | 9/2009 | Lorenz et al. |
| 8,078,570 | B2 | 12/2011 | Chen et al. |
| 2005/0283579 | A1 | 12/2005 | De Jong et al. |
| 2006/0004756 | A1 | 1/2006 | Peleg et al. |
| 2006/0136511 | A1 | 6/2006 | Ngo et al. |
| 2020/0183836 | A1* | 6/2020 | Johns ............... G06F 12/084 |
| 2021/0026561 | A1* | 1/2021 | Ginzburg ......... G06F 16/2272 |

FOREIGN PATENT DOCUMENTS

CA      2 391 826 A1   12/2000

OTHER PUBLICATIONS

International Search Report dated May 3, 2022 for International Application No. PCT/US2022/011798.
Written Opinion dated May 3, 2022 for International Application No. PCT/US2022/011798.

\* cited by examiner

*Primary Examiner* — Masud K Khan
*Assistant Examiner* — Dustin B. Fulford
(74) *Attorney, Agent, or Firm* — Crowell & Moring LLP (57) ABSTRACT

A data storage device and method for preventing accidental updates and deletions using data versioning are provided. In one embodiment, a data storage device is provided comprising a memory and a controller. The controller is configured to: receive a command from a host to modify data stored in the memory, wherein the data is associated with a host identifier created by the data storage device; determine whether the host is associated with the host identifier; in response to determining that the host is associated with the host identifier, modify the data; and in response to determining that the host is not associated with the host identifier, create a new version of the data without modifying the data. Other embodiments are provided.

20 Claims, 8 Drawing Sheets

| LBA | Physical Addr |
|---|---|
| 0-100 | A |
| 100-250 | M |
| 500-700 | F |
| 800-1000 | A |

Typical L2P Mapping

FIG. 5A

| LBA | Version, Physical Addr |
|---|---|
| 0-100 | (0,A) |
| 100-250 | (0,A), (3,G), (5,M) |
| 500-700 | (0,A), (1,F) |
| 800-1000 | (0,A) |

L2P Mapping with Data Versioning

DATA STORAGE DEVICE AND METHOD FOR PREVENTING ACCIDENTAL UPDATES AND DELETIONS USING DATA VERSIONING

BACKGROUND

A host can store data in a data storage device and later retrieve the data. In many situations, the data written by the host can be updated or deleted by the host or another host. This can occur, for example, in a shared namespace in a Non-Volatile Memory Express (NVMe) environment.

DETAILED DESCRIPTION

Overview

By way of introduction, the below embodiments relate to a data storage device and method for preventing accidental updates and deletions using data versioning. In one embodiment, a data storage device is provided comprising a volatile memory, a non-volatile memory, and a controller. The controller is configured to: receive a command from a host to modify data stored in the memory, wherein the data is associated with a host identifier created by the data storage device; determine whether the host is associated with the host identifier; in response to determining that the host is associated with the host identifier, modify the data; and in response to determining that the host is not associated with the host identifier, create a new version of the data without modifying the data.

In some embodiments, the controller is further configured to update a logical-to-physical address table to associate a logical address with both the data and the new version of the data.

In some embodiments, an entry in the updated logical-to-physical address table for the logical address is associated with a first physical memory address for the data and a second physical memory address for the new version of the data.

In some embodiments, the controller is further configured to: receive a command from the host to delete the data stored in the memory; determine whether the host is associated with the host identifier; in response to determining that the host is associated with the host identifier, delete the data without confirming the command to delete the data; and in response to determining that the host is not associated with the host identifier, delete the data after confirming the command to delete the data.

In some embodiments, the controller is further configured to update a logical-to-physical address table to reflect that the data has been deleted.

In some embodiments, the controller is further configured to tag the data with the host identifier.

In some embodiments, the controller is further configured to tag the data with a version identifier and create a new version identifier for the new version of the data.

In some embodiments, the controller is further configured to communicate with a plurality of hosts in a Non-Volatile Memory Express (NVMe) environment.

In some embodiments, a logical region of the memory is configured to be shared among the plurality of hosts as a shared namespace.

In some embodiments, the memory comprises a three-dimensional memory.

In another embodiment, a method is provided that is performed in a data storage device comprising a memory storing data. The method comprises: receiving a command from a host to modify the data; determining whether the data was initially stored by the host; in response to determining that the data was initially stored by the host, modifying the data; and in response to determining that the data was not initially stored by the host, creating a new version of the data without modifying the data.

In some embodiments, the method further comprises updating a logical-to-physical address table to associate a logical address with both the data and the new version of the data.

In some embodiments, the method further comprises: receiving a command from the host to delete the data; determining whether the data was initially stored by the host; in response to determining that the data was initially stored by the host, deleting the data without confirming the command to delete the data; and in response to determining that the data was not initially stored by the host, deleting the data after confirming the command to delete the data.

In some embodiments, the method further comprises updating a logical-to-physical address table to reflect that the data has been deleted.

In some embodiments, the method further comprises tagging the data with a host identifier.

In some embodiments, the host identifier is used to determine whether the data was initially stored by the host.

In some embodiments, the method further comprises tagging the data with a version identifier; and creating a new version identifier for the new version of the data.

In some embodiments, the data storage device is configured to communicate with a plurality of hosts in a Non-Volatile Memory Express (NVMe) environment.

In some embodiments, a logical region of the memory is configured to be shared among the plurality of hosts as a shared namespace.

In another embodiment, a data storage device is provided comprising: a memory; means for receiving a command from a host to modify data stored in the memory, wherein the data is associated with a host identifier created by the data storage device; means for determining whether the host is associated with the host identifier; means for modifying the data in response to determining that the host is associated with the host identifier; and means for creating a new version of the data without modifying the data in response to determining that the host is not associated with the host identifier.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
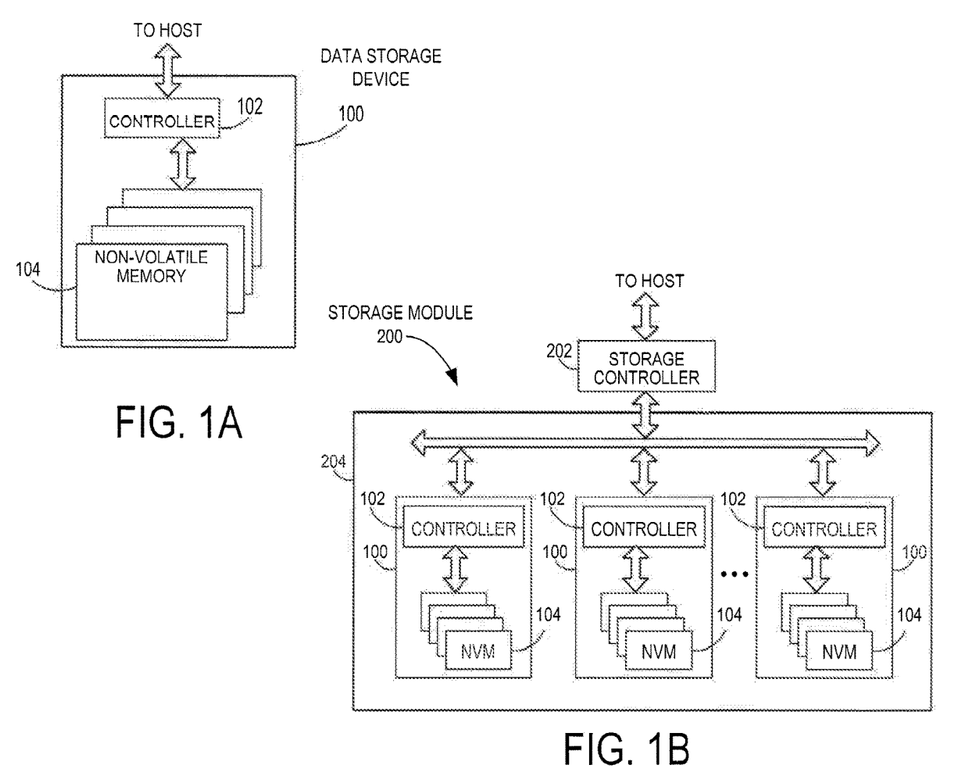
FIG. 1A is a block diagram of a data storage device of an embodiment.
FIG. 1B is a block diagram illustrating a storage module of an embodiment.
Figure 1C:
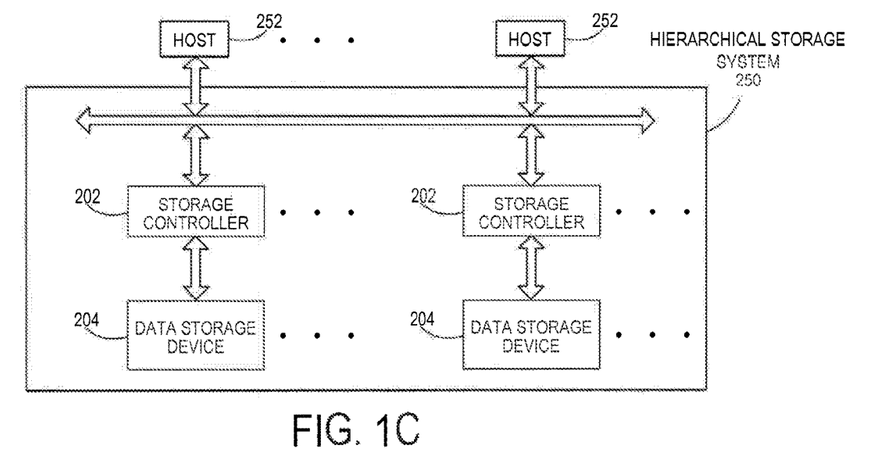
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
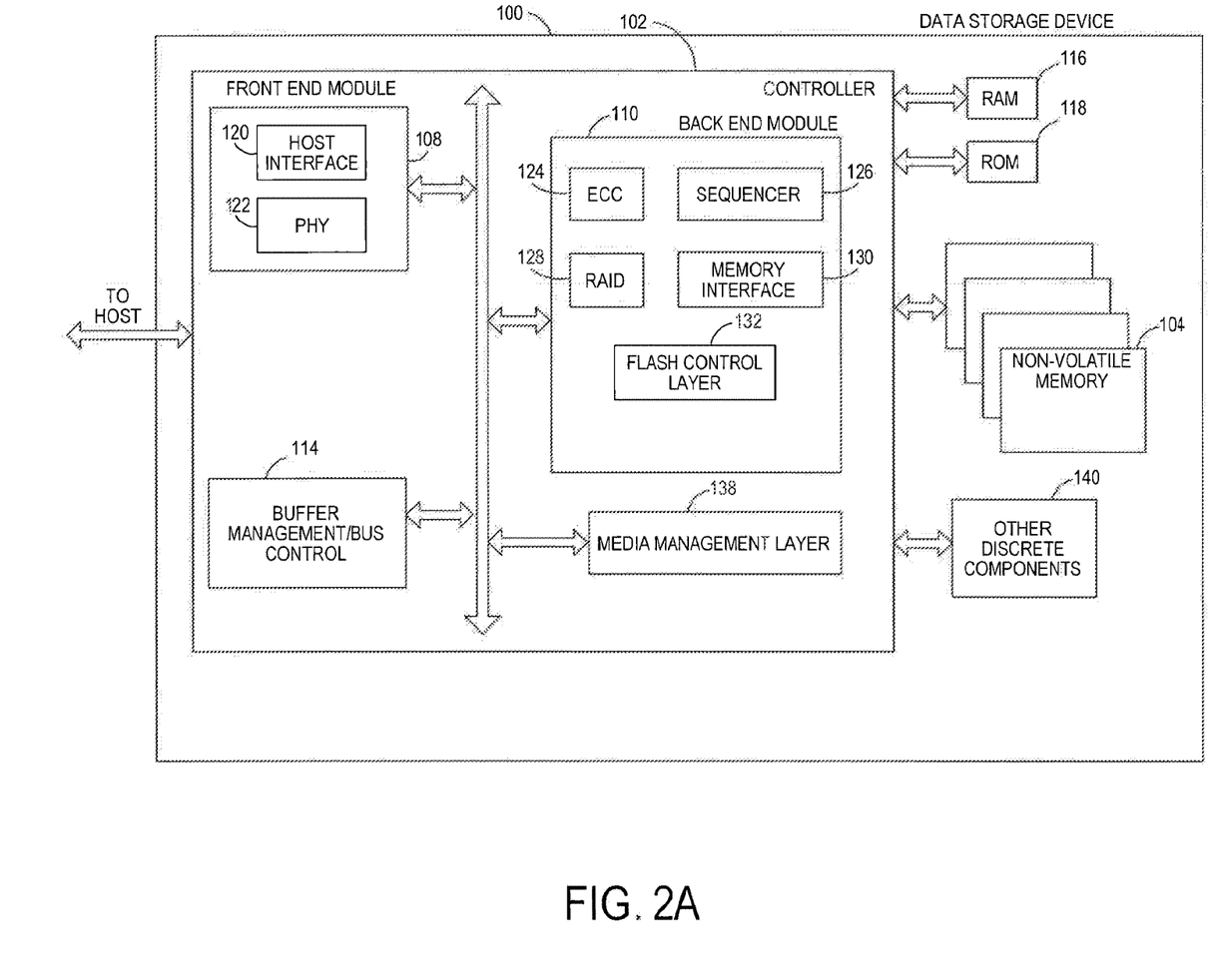
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
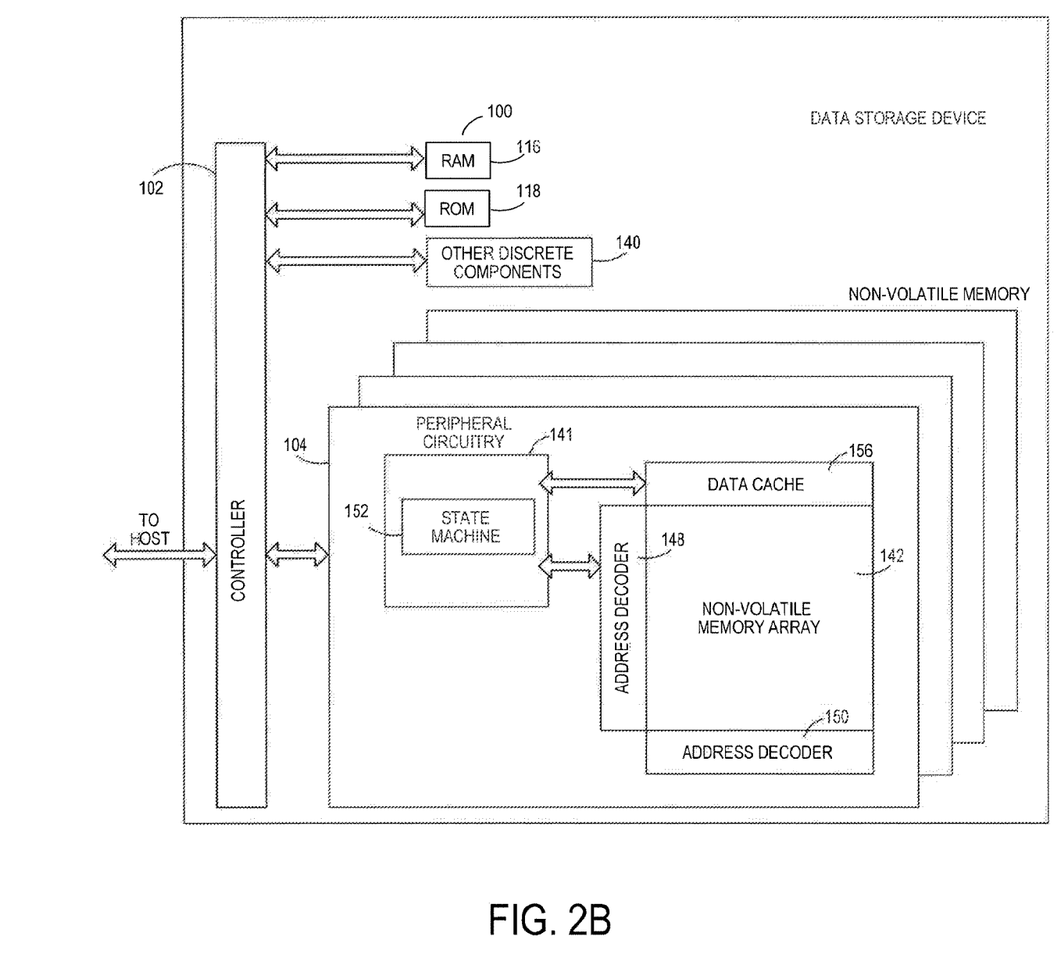
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
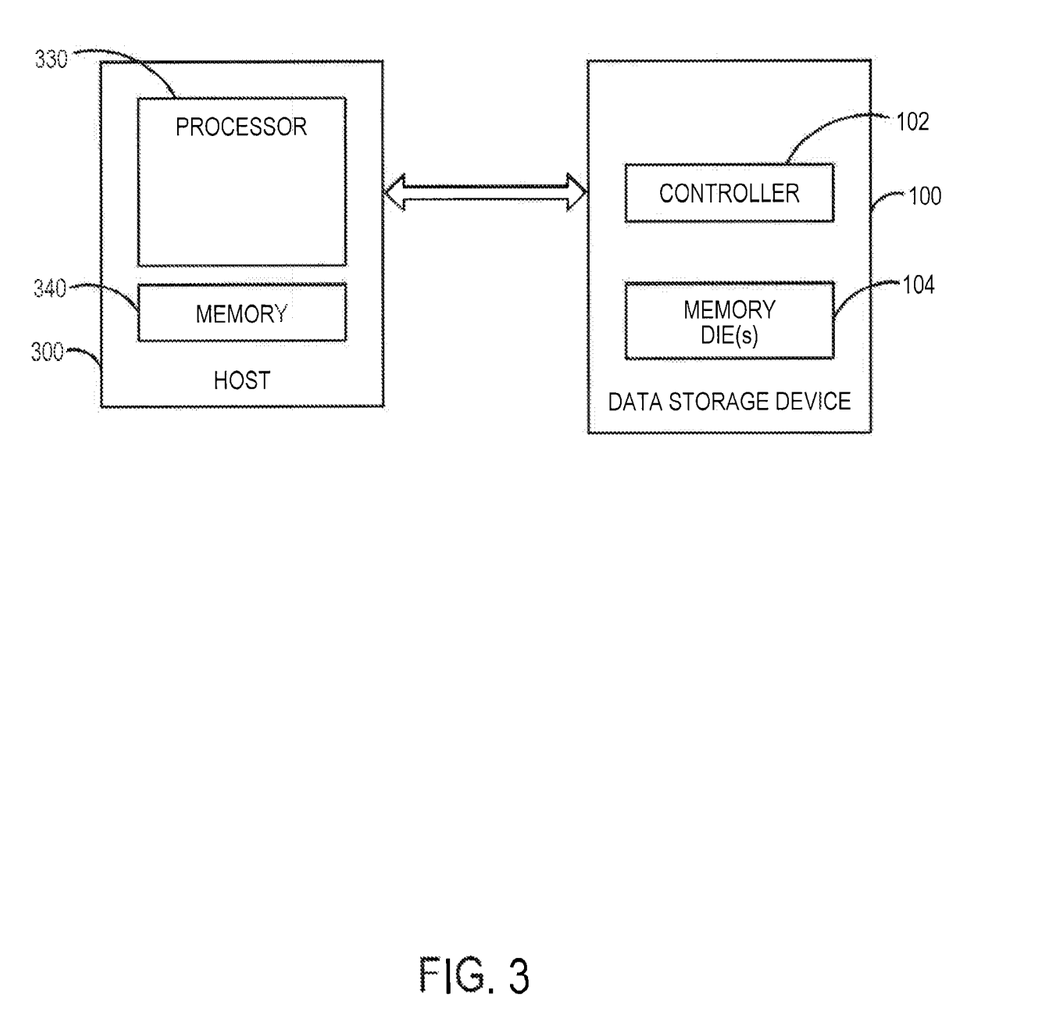
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Figure 4:
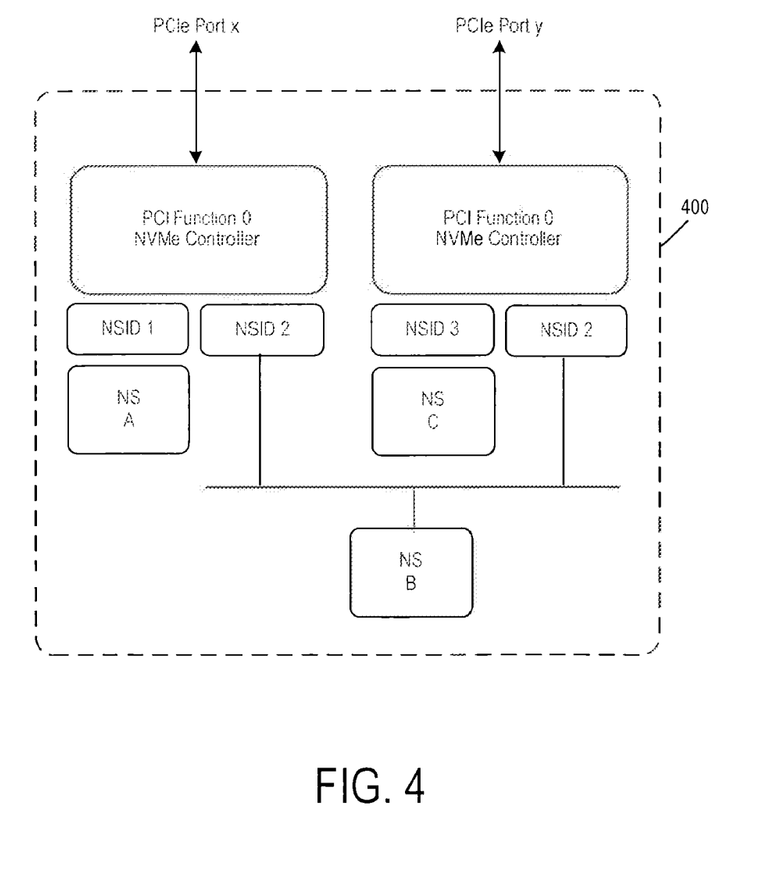
FIG. 4 is a block diagram of a shared namespace environment of an embodiment.

As mentioned above, the host 300 can store data in the data storage device 100 and later retrieve the data. In many situations, the data written by the host 100 can be updated or deleted by the host 100 or another host. This can take place, for example, in an NVMe shared namespace environment where multiple hosts can have access to the shared namespace and can create their own versions for the same logical region, also allowing access to the other versions. Such an environment is illustrated in FIG. 4. However, it should be noted that these embodiments can be used in other environments and that the shared namespace environment should not be read into the claims unless expressly recited therein.

As shown in FIG. 4, this data storage device 400 comprises two NVMe controllers, each connected to a different PCIe port for connection to the host 300. The first NVMe controller is associated with namespace identifiers (NSIDs) 1 and 2, and the second NVMe controller is associated with namespace identifiers (NSIDs) 2 and 3. NSID 1 has an area of memory 104 designated as namespace (NS) A, NSID 2 has an area of memory 104 designated as namespace NS B, and NSID 3 has an area of memory 104 designated as namespace NS C. Because NS B is shared by two hosts, each host can write data to the namespace, as well as alter or delete that data.

There can be instances where a user may want to revert to an older version of the data that was updated. For example, if the data is a document that was updated with changes, the user may wish to view the original version of the document before the changes were made. The following embodiments can be used to allow a host to access the previous version of the data, which may have been updated by that host or some other host. More specifically, the data storage device can maintain a versioning for the data in the shared namespace if multiple hosts change the same logical region, and all the versions are available for access to all the other hosts.

More generally, with these embodiments, the data storage device 100 can prevent accidental updates/deletion of data by facilitating device-side versioning of the data. This can be handled by taking an input from the host 300 as to whether to allow versioning for the data being written or by taking a decision on the device 100 itself whether to enable data versioning based on device usage. The controller 102 in the data storage device 100 can create an additional layer in a logical-to-physical address table in the form of a list to accommodate the different physical locations for the different versions of the data, thus adding extra space dynamically for only those regions that have been changed with versioning enabled.

In one embodiment, data to be versioned is tagged, so the data storage device 100 knows that special handling needs to be done for that data (e.g., for data versioning and/or accidental deletion protection). The tagging can be done by the data storage device 100 or by the host 300. Both of these alternates are discussed below. It should be noted that these alternatives can be used independently or in combination with each other. In should also be noted that, in one embodiment, all hosts have access to all versions of the data. The host may be aware about the versioning that is happening and, thus, may be aware about some extra space being occupied by the other copies (versions).

Turning first to the embodiment where the tagging is done by the data storage device 100, in this embodiment, the data storage device 100 tags the data with a "Host ID" and/or a "Version ID" for version control of data. When the same host updates the data, it will be a typical overwrite. However, when another host tries to update some data that was written by some other host, it gets a prompt whether to create a new version while retaining the older version that was written by the other host. In case the other host tries to delete this data, it will be prompted that another host wrote this data and if he still wants to delete it. This embodiment will now be described in more detail in conjunction with the flow chart 600 in FIG. 6.

Figure 6:
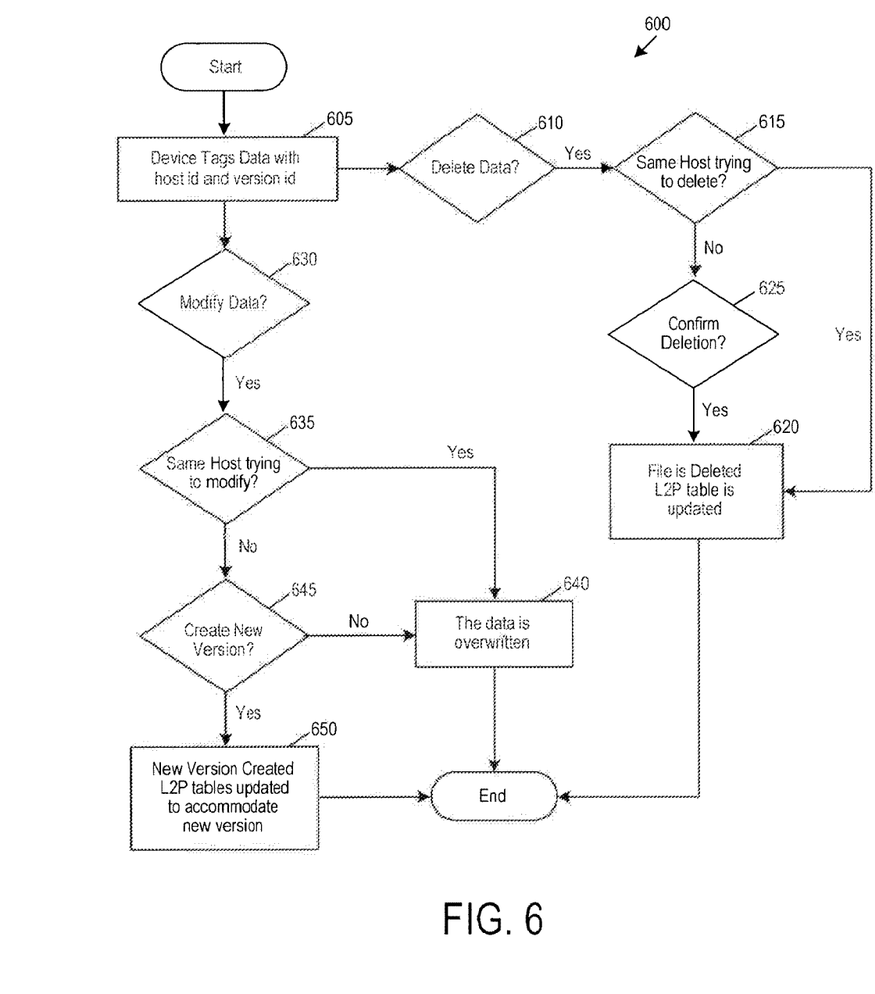
FIG. 6 is a flow chart of a device-managed method of an embodiment for preventing accidental updates and deletions using data versioning.

As shown in FIG. 6, in this embodiment, when the data storage device 100 receives data the host 300 for storage in the memory 104, the controller 102 tags the data with an identifier of the host (Host ID) and a version identifier (Version ID) of the data (605). When the data storage device 100 receives a command to alter the data, the controller 102 determines whether the command is a command to delete the data (610) or modify the data (630). (Accidental deletion prevention can be used in addition to or instead of data versioning, as both can be triggered by the data being tagged as "important.")

If the command is to delete the data, the controller 102 determines if the command is coming from the same host as the host that initially wrote the data (615). If it is the same host, the data storage device 100 assumes that the host know what it is doing, and the controller 102 deletes the data without asking for confirmation first (620). If a different host is asking to delete the data, the controller 102 asks the host for confirmation before deleting the data (625). This acts as a double check and makes sure the host really wants to go forward with the deletion. After the data is deleted, the controller 102 updates the logical-to-physical address table.

If the command is to modify the data, the controller 102 determines if the command is coming from the same host as the host that wrote the data in the first place (635). If it is the same host, the data storage device 100 assumes that the host knows what it is doing, and the controller 102 overwrites the old data with the new data (640). If a different host is asking to modify the data, the controller 102 determines if that host is trying to create a new version of the data (645). If it is not, the data is overwritten (640). However, if the host is trying to create a new version of the data, the controller 102 creates the new version of the data and stores it in the memory 104 (650). The controller 102 also updates the logical-to-physical address table to accommodate the new version (650).

As mentioned above, in another embodiment, the host (user) tags data as "important" to prevent accidental update/deletion. In this embodiment, when the same host makes any change to that data, it is given an option to update (overwrite) the file or to create a new version for the file. When a different host tries to makes any change to that data, it will be prompted whether to retain the older version or not. In this way, irrespective of the host, a prompt will be given asking for a confirmation on deletion, as the host previously marked the data as important. This embodiment will be described in more detail in conjunction with the flow chart 700 in FIG. 7.

Figure 7:
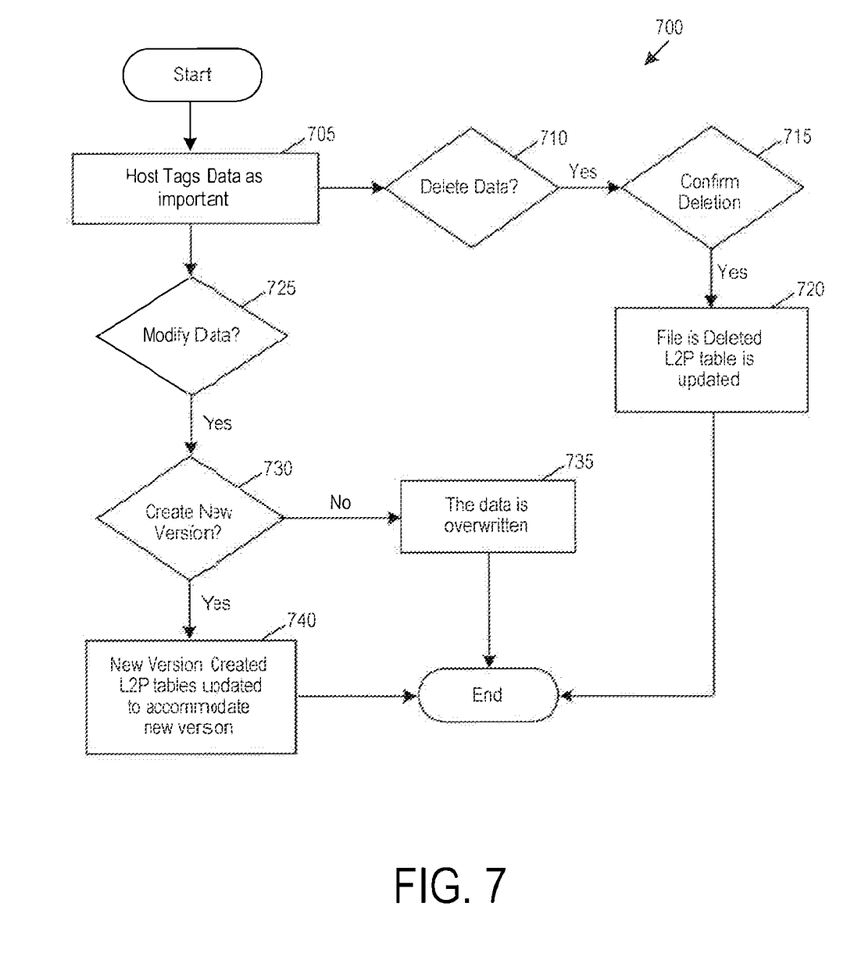
FIG. 7 is a flow chart of a host-assisted method of an embodiment for preventing accidental updates and deletions using data versioning.

As shown in FIG. 7, in this embodiment, it is responsibility of the host—not the data storage device 100—to identify data that is subject to alteration prevention techniques. So, as shown in FIG. 7, the host tags data that it considers important before the data is sent to the data storage device 100 for storage in the memory 104 (705). When the data storage device 100 receives a command to alter the data, the controller 102 determines whether the command is a command to delete the data (710) or modify the data (720).

If the command is to delete the data, the controller 102 asks the host for confirmation before deleting the data (715). This acts as a double check and makes sure the host really wants to go forward with the deletion, since the data was designated as important. Once confirmation is received, the controller 102 deletes the data and updates the logical-to-physical address table (720).

If the command is to modify the data, the controller 102 determines if the host is trying to create a new version of the data (730). If it is not, the data is overwritten (735). However, if the host is trying to create a new version of the data, the controller 102 creates the new version of the data and stores it in the memory 104 (740). The controller 102 also updates the logical-to-physical address table to accommodate the new version. Accordingly, backend support from the data storage device 100 can be required where the flash translation layer (FTL) module manages the logical-to-physical address translation page updates/deletions in a linked list.

To handle the backend support for version controlling of data in any of the above embodiments, a modification can be made to the logical-to-physical address mapping tables to include information about data version. Consider an example in which the host writes logical block addresses (LBAs) 0-1000 and then rewrites LBAs 500-700 ("version 1"). The controller 102 maintains the older LBAs 500-700 as "version 0" (another layer of switchable address translation (SAT) to maintain the LBA versions) instead of invalidating it, as would be typical. Any host can access any version of the data (e.g., document), as the controller 102 is aware of the different versions of the data document. The host is also allowed to delete a particular version for the document, which also can require an additional confirmation to prevent accidental deletion.

Figure 5A:
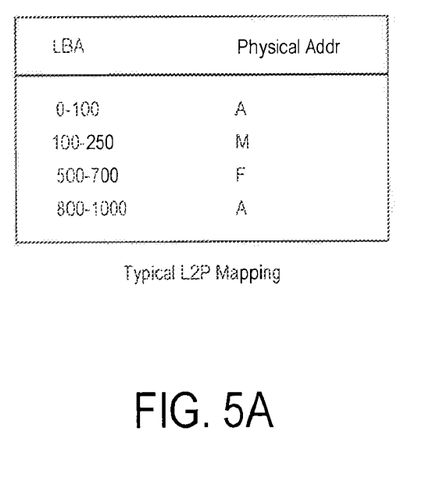
FIG. 5A is an illustration of a logical-to-physical address map of an embodiment without data versioning.
Figure 5B:
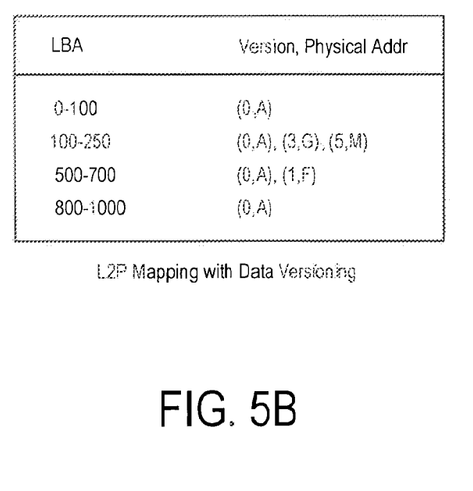
FIG. 5B is an illustration of a logical-to-physical address map of an embodiment with data versioning.

FIGS. 5A and 5B show logical-to-physical address maps that illustrate the backend logical-to-physical (L2P) address mapping to support data versioning. FIG. 5A shows typical L2P mapping, where each LBA range is associated with one physical address in the memory 104. FIG. 5B shows how L2P mapping is maintained in the backend to accommodate data versioning. As shown in FIG. 5B, this table introduces another layer of L2P mapping that creates entries only for the specific logical regions that undergo versioning. The table makes use of a linked list containing the different physical regions where a different version of the data is present. The list allows dynamic addition and deletion of the version entries and their physical locations.

The different versions of the same logical region can be tagged with a Host ID and/or a Version ID. The additional layer of L2P mapping can be only for the changed logical region (versioned data), in which case the rest of the logical regions that are not versioned remain the same, as in typical systems. Any host can access the data from the data storage device 100 according to a Host ID and/or a Version ID. Multiple combinations of data accesses can be provided. In some cases, the host may also provide specific keys for some logical data, wherein certain versions may be protected from some hosts. There is an additional advantage if the data storage device 100 allows the host to compare the versions and provide a difference by only analyzing the LBA version in the LBA range that is already stored in the control blocks to avoid actually comparing the entire data.

There are many advantages associated with these embodiments. For example, these embodiments can be used to prevent accidental updates of data by creating new versions, prevent accidental deletion by asking for a deletion confirmation if the data is marked as important, and version data to allow any host to access different versions of data in a shared namespace. Also, with these embodiments, only the difference in the data of the two versions may be added in the storage as part of the update (the difference can be in terms of logical regions stored as control data). Further, with these embodiments, there can be minimal overhead in the data storage device 100 for maintaining the version of the data to facilitate the feature. Additionally, the host may provide a difference in the versions where it can return the LBA regions that are different by a simple look up on the SAT with no actual data comparison needed.

As mentioned above, these embodiments may be highly beneficial for NVMe shared namespace environments since, in those environments, multiple hosts can access and change/delete data in a shared logical memory region. With these embodiments, an accidental update or deletion of data may be prevented using version controls and confirmatory prompts. Also, these embodiments can be used in environments where there is a human user of the data storage device (e.g., a retail device) or in other environments, such as automotive, Internet of Things, or industrial environments. For example, host IDs/file IDs can be used in automotive/enterprise use cases along with versioning enable/disable to understand the requirements in environments without manual (human) intervention. As another example, a Version ID can be associated with a particular host (Host ID) if versioning is enabled, which would not require manual intervention.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    a controller configured to:
        receive a command from a host to modify data stored in the memory, wherein the data is associated with a host identifier created by the data storage device;
        determine whether the host is associated with the host identifier;
        in response to determining that the host is associated with the host identifier, modify the data; and
        in response to determining that the host is not associated with the host identifier, create a new version of the data without modifying the data.

2. The data storage device of claim 1, wherein the controller is further configured to update a logical-to-physical address table to associate a logical address with both the data and the new version of the data.

3. The data storage device of claim 1, wherein the controller is further configured to:
    receive a command from the host to delete the data stored in the memory;
    determine whether the host is associated with the host identifier;
    in response to determining that the host is associated with the host identifier, delete the data without confirming the command to delete the data; and
    in response to determining that the host is not associated with the host identifier, delete the data after confirming the command to delete the data.

4. The data storage device of claim 3, wherein the controller is further configured to update a logical-to-physical address table to indicate that the data has been deleted.

5. The data storage device of claim 1, wherein the controller is further configured to tag the data with the host identifier.

6. The data storage device of claim 1, wherein the controller is further configured to:
    tag the data with a version identifier; and
    create a new version identifier for the new version of the data.

7. The data storage device of claim 1, wherein the controller is further configured to communicate with a plurality of hosts in a Non-Volatile Memory Express (NVMe) environment.

8. The data storage device of claim 7, wherein a logical region of the memory is configured to be shared among the plurality of hosts as a shared namespace.

9. The data storage device of claim 1, wherein the memory comprises a three-dimensional memory.

10. A method comprising:
performing the following in a data storage device comprising a memory storing data:
receiving a command from a host to modify the data;
determining whether the data was initially stored by the host;
in response to determining that the data was initially stored by the host, modifying the data; and
in response to determining that the data was not initially stored by the host, creating a new version of the data without modifying the data.

11. The method of claim 10, further comprising updating a logical-to-physical address table to associate a logical address with both the data and the new version of the data.

12. The method of claim 10, further comprising:
receiving a command from the host to delete the data;
determining whether the data was initially stored by the host;
in response to determining that the data was initially stored by the host, deleting the data without confirming the command to delete the data; and
in response to determining that the data was not initially stored by the host, deleting the data after confirming the command to delete the data.

13. The method of claim 12, further comprising updating a logical-to-physical address table to reflect that the data has been deleted.

14. The method of claim 10, further comprising tagging the data with a host identifier.

15. The method of claim 14, wherein the host identifier is used to determine whether the data was initially stored by the host.

16. The method of claim 10, further comprising:
tagging the data with a version identifier.

17. The method of claim 10, wherein the data storage device is configured to communicate with a plurality of hosts in a Non-Volatile Memory Express (NVMe) environment.

18. The method of claim 17, wherein a logical region of the memory is configured to be shared among the plurality of hosts as a shared namespace.

19. A data storage device comprising:
a memory;
means for receiving a command from a host to modify data stored in the memory, wherein the data is associated with a host identifier created by the data storage device;
means for determining whether the host is associated with the host identifier;
means for modifying the data in response to determining that the host is associated with the host identifier; and
means for creating a new version of the data without modifying the data in response to determining that the host is not associated with the host identifier.

20. The method of claim 16, further comprising:
creating a new version identifier for the new version of the data.

* * * * *